(12) United States Patent
Falanga (10) Patent No.: US 6,570,278 B1
(45) Date of Patent: May 27, 2003

(54) ELECTROMAGNETIC INTEGRATED DRIVER ALTERNATOR

(76) Inventor: Salvatore Falanga, 400 Bitters Rd., No. 401, San Antonio, TX (US) 78216

( * ) Notice: Subject to any disclaimer, the term of this patent is extended or adjusted under 35 U.S.C. 154(b) by 0 days.

(21) Appl. No.: 09/769,008

(22) Filed: Jan. 24, 2001

Related U.S. Application Data (60) Provisional application No. 60/178,013, filed on Jan. 24, 2000.

(51) Int. Cl.[7] ............................................. H02K 11/00
(52) U.S. Cl. ....................... 310/68 R; 310/113; 310/114
(58) Field of Search ........................... 310/68 R, 68 B, 310/112, 102 R, 114, 166, 155, 171, 266, 113; 318/822, 825, 425

(56) References Cited

U.S. PATENT DOCUMENTS

| | | | | |
|---|---|---|---|---|
| 4,085,355 A | | 4/1978 | Fradella | ...................... 318/168 |
| 4,600,873 A | * | 7/1986 | Roesel, Jr. et al. | ......... 318/701 |
| 4,829,205 A | | 5/1989 | Lindgren | ..................... 310/166 |
| 4,945,296 A | * | 7/1990 | Satake | ........................ 318/538 |
| 5,281,879 A | | 1/1994 | Satake et al. | ................ 310/114 |
| 5,783,893 A | | 7/1998 | Dade et al. | .................. 310/266 |
| 5,880,550 A | * | 3/1999 | Fukao et al. | ................. 310/179 |
| 5,905,319 A | * | 5/1999 | McLendon | ................ 310/68 R |
| 6,097,126 A | * | 8/2000 | Takura | ........................ 310/166 |
| 6,310,405 B1 | * | 10/2001 | Han et al. | ....................... 290/7 |

* cited by examiner

Primary Examiner—Thanh Lam
(74) Attorney, Agent, or Firm—Cox & Smith Incorporated (57) ABSTRACT

The electrical mechanism of the present invention is constructed with two rotating elements and a static element, when normally an electrical machine (generator or motor) is made with one rotor and one stator only. This invention applies a unique concept of rotating magnetic fields integrated with an electronically controlled electromagnetic reaction driver. The result is a very reliable machine, light weight and not very expensive. In addition, the size and weight of the present invention are smaller (compared to devices operating at the same power) than other AC constant frequency generators working at variable speed.

1 Claim, 6 Drawing Sheets

ELECTROMAGNETIC INTEGRATED DRIVER ALTERNATOR

RELATION TO PRIOR FILED APPLICATIONS

The present application claims the benefit of the filing date of U.S. Provisional Patent Application Ser. No. 60/178,013 filed Jan. 24, 2000.

BACKGROUND OF THE INVENTION

1. Field of the Invention

The electrical mechanism of the present invention is very different from most other electrical machines currently in use or development. It is constructed with two rotating elements and a static element, when normally an electrical machine (generator or motor) is made with one rotor and one stator only. This invention applies a new working concept of rotating magnetic fields integrated with a new electronically controlled electromagnetic reaction driver. The result is a very reliable machine, light weight and not very expensive. In addition, the size and weight of the present invention are smaller (compared to devices operating at the same power) than other AC constant frequency generators working at variable speed.

2. Description of the Related Art

A generic alternator is typically made with two major parts only (if we don't consider the external generator control unit):

a. One inductor, generally a rotor, with magnetic poles and excitation coils (or inductors) supplied in DC from an external power supply. The rotor is mechanically driven from an external motor or engine.

b. One stator, mechanically fixed or anchored on a ground. The stator has inducted wire windings that generate the required electrical power.

When the rotor is running and its excitation coils are energized, the magnetic poles of the rotor will generate a running magnetic field that will induce in the inducted wire windings of the stator an electrical voltage, and if an electrical load is already connected, also an electrical current. Finally, the electrical power generated on the stator is the result of an "action" generated from the rotor. We know that for any generated action there exists a reaction with the same intensity but opposite. In fact, the result of the rotor action is a generation of an opposite torque from the poles of the stator that will attempt to stop or decrease the rotor speed. Therefore, the rotor will be obligated to absorb more mechanical power from the engine to maintain the same speed.

BRIEF SUMMARY OF THE INVENTION

The configuration of the driver/alternator of the present invention is brushless but it is possible to make a commercial configuration with brushes.

The driver/alternator of the present invention is comprised of six major parts as follows:

a. One driver rotor
b. One inductor rotor
c. One stator
d. One generator control unit
e. One speed control unit
f. One control power unit

DETAILED DESCRIPTION OF THE PREFERRED EMBODIMENTS

Figure 1:
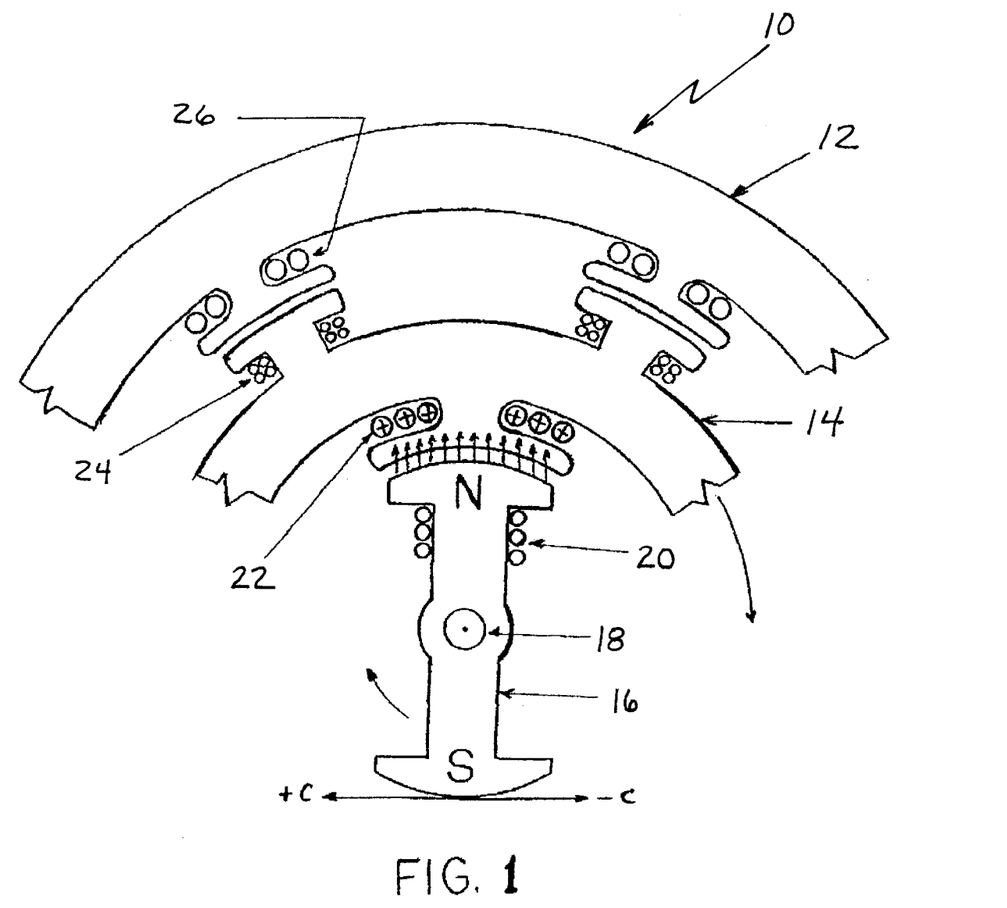
FIG. 1 is a schematic cross-sectional view of the structural components of the present invention.

The driver/alternator (10) of the present invention is comprised of six major parts as follows and as shown in FIG. 1:

a. One driver rotor (16).
b. One inductor rotor (14)
c. One stator (12)
d. One generator control unit (30)(in FIG. 2)
e. One speed control unit (34) (in FIG. 2)
f. One control power unit (32) (in FIG. 2)

The driver rotor (16) may be mechanically driven from an auxiliary pad of a turbine engine or from any kind of internal combustion motor. The full output power generated from the device of the present invention is supplied from its driver rotor (16) by a rotating magnetic field to its inductor rotor (14) and then converted by its stator (12) into electrical power at a constant frequency and voltage.

Figure 2:
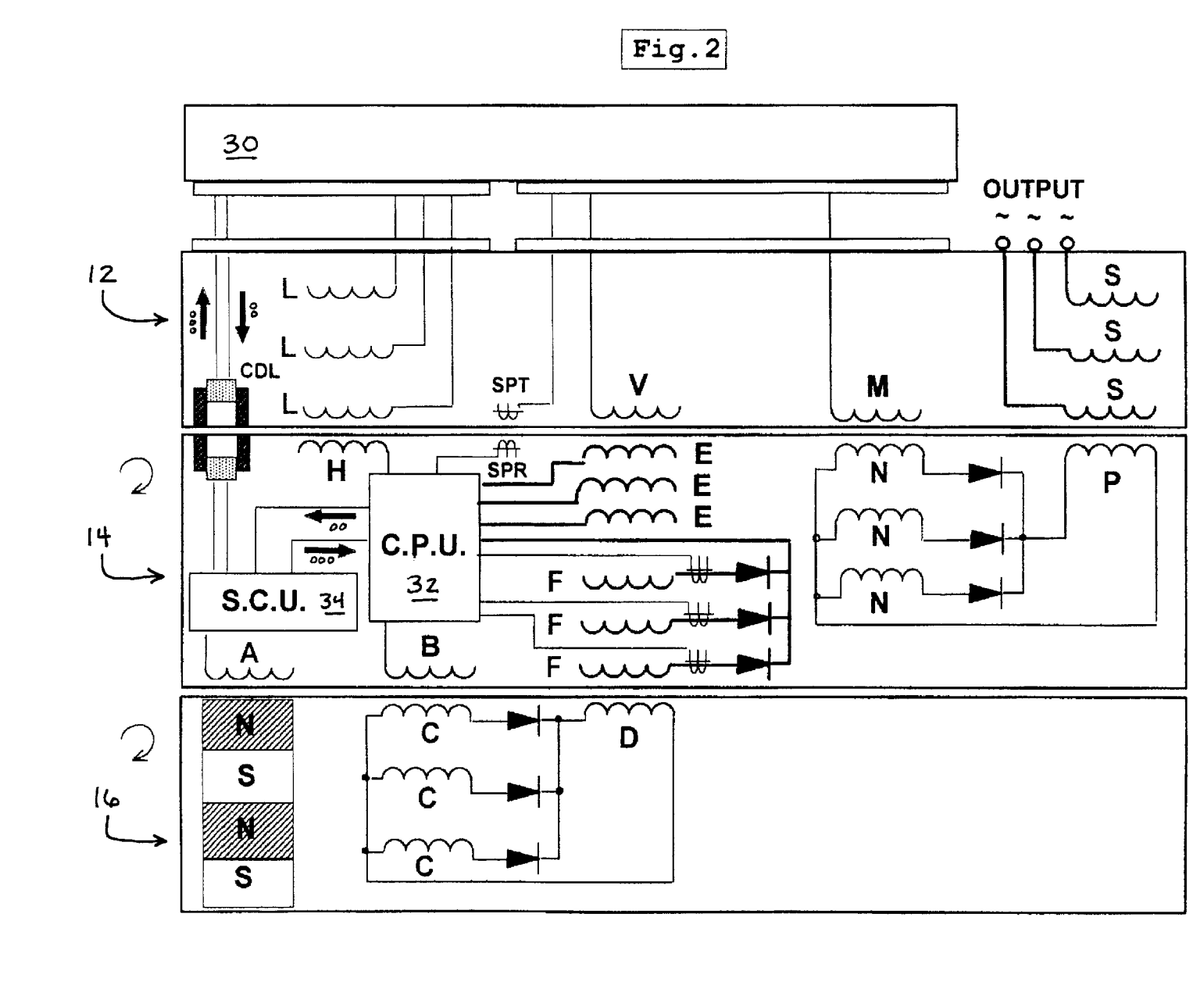
FIG. 2 is a modified electronic schematic diagram showing the electrical components of the present invention.
Figure 3:
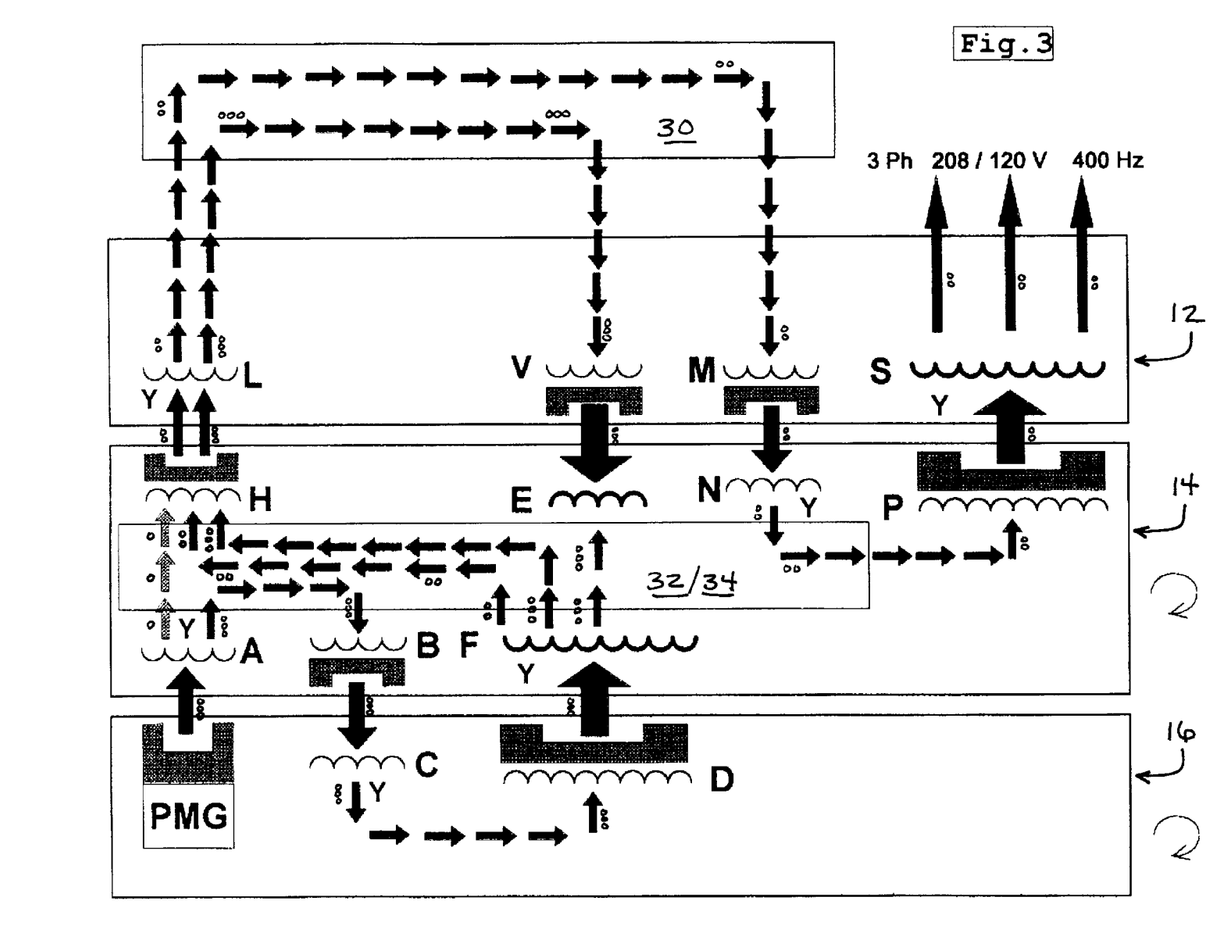
FIG. 3 is the modified electronic schematic diagram of FIG. 2 incorporating power flow indications for both motor power and load power.

Almost 50% of power supplied from the driver rotor (16) is directly converted into mechanical rotating power of the inductor rotor (14) by the electromagnetic interaction between the inducted electrical currents in the wirewindings (22) and (24) of the same inductor rotor (14) and the rotating magnetic field of the driver rotor (16) (see FIGS. 2 and 3). The second 50% of the power supplied from the driver rotor (16) is "indirectly" converted into mechanical rotating power of the inductor rotor (14) by the electronically controlled electromagnetic reaction driver (E.R.D.E.C. shown in FIG. 4). The first function of the electronically controlled electromagnetic reaction driver is to reduce at minimum values the shifting phases between the rotating magnetic fields of the driver rotor (16) and the inducted rotating magnetic fields of the inductor rotor (14), during the full variation of their differential speed $\omega=\omega_{DR}-\omega_{IR}$. The second electronically controlled electromagnetic reaction driver function is to synchronize the dynamic magnetic pole configuration of the inductor rotor (14) with the fixed magnetic pole configuration of the stator (12) and then to convert the electromagnetic reaction between the shifting electrical current in the inductor rotor wire windings (22) and (24) and the stator magnetic field into a mechanical rotating power of the same inductor rotor (14). Finally, the inductor rotor (14), driven at constant speed, converts its mechanical rotating power in electrical power on the stator (12) at constant frequency and voltage by electromagnetic interactions with the same stator (12).

The generator control unit or GCU (30) (shown in FIG. 2) is an external electronic control box that regulates and controls all electrical parameters of the generated power. The speed control unit or SCU (34) and the control power unit or CPU (32) are electronics units installed on the inductor rotor (14) and both intercommunicate with the external generator control unit (30) by a unique data link, to control and regulate at the same time, by the same and/or different electrical and/or electronic systems, the inductor rotor speed. Because of this unique feature the present invention is not a dissipative mechanical power transformer/converter but it is a real transformer of the mechanical power parameters combined with an electrical power converter.

In the alternator (10) design of the present invention, the free running stator (actually the inductor rotor (14)) is not fixed or anchored on a ground but free to run (see FIG. 1). When the rotor (16) is in motion and energized and no electrical load is connected on the wire winding of the free running stator (14), the free running stator (14) will generate an electrical voltage in its wires, but, without current. So, no power will be transferred, and the rotor (16) will absorb from the engine a minimum amount of mechanical power to supplant the lost power due to friction, parasitic current, etc. When the wire windings of the free running stator (14) are closed on an electrical load, an electrical current will be generated, and a reaction torque "–C" on the poles of the free running stator (14), and then on the poles of the rotor (16), will be present (see FIG. 1).

The reaction or negative torque generated from the free running stator (14) may be computed as follows:

$$-C = K_C \times N \times B \times L \times I \times D/2$$

Where $K_C$=constant factor

N=number of wires in bundle

B=magnetic induction

L=length of wire bundles

I=current intensity in the wires

D=rotor diameter

Because for any action there is an equal and opposite reaction, we would expect the free running stator (14) to tend to run in the opposite direction from that of the rotor (16) (due to the effect of the reaction torque), when in fact the free running stator (14) will run in the same direction as that of the rotor (16).

Figure 1A:
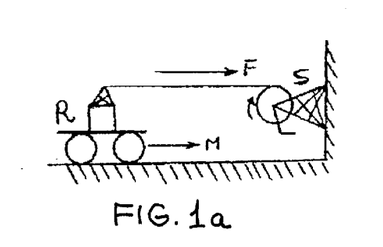
FIGS. 1a and 1b are demonstrative representations of the forces involved in the operation of the present invention.
Figure 1B:
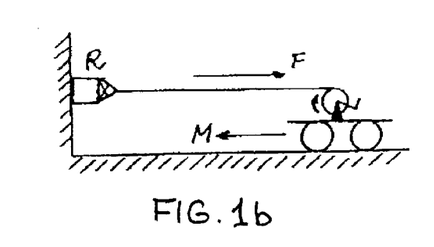

In fact, imagine a capstan (see FIGS. 1a and 1b) that simulates a fixed normal stator and that attempts to pull with an intensity "F" of power, the rotor "R" on wheels traveling already in a direction opposite that of "F". The result is the reduction of the motor speed due to the speed resistance of the opposite motion "M" (generated from the power "F"), because "F" and "M" have the same direction.

Now, suppose a rotor with a large inertia or for simulation, fixed on a wall (see FIG. 1b), and a free running stator on wheels with a capstan. When we attempt to pull the rotor with the power "F", the result is a motion of the free running stator in the opposite versus of the applied power "F". Really, the power "F" pulls the rotor "R" in the attempt to attract it but the stator is pushed against the rotor "R", so, in this case, power "F" and motion "M" have different directions.

In the configuration of the present invention, the "rotor" of the example is the driver rotor (16), and the "free running stator" is the inductor rotor (14). Now, if the driver rotor (16) is mechanically driven from an engine having large inertia and power, the reaction torque "–C" generated from the poles of the inductor rotor (14) cannot modify the motion of the driver rotor (16). Therefore, the reaction torque "–C" will push the inductor rotor (14) to run in the same direction as that of the driver rotor (16). In other words, since the reaction torque is not able to modify the motion of the driver rotor (16), it attempts to eliminate itself by pushing the inductor rotor (14) to run in the same direction as driver rotor motion. In fact, if for example, the inductor rotor (14) reaches the driver rotor speed (of course in the same direction), all of the electromagnetic interactions between the inductor rotor (14) and the driver rotor (16) will disappear. There will not be an electrical voltage inducted in the inductor rotor wire windings (22), therefore, no current will be induced and no reaction torque "–C" will be present because the motion between inductor rotor wires (22) and the driver rotor rotating magnetic field disappears. This is the condition of differential speed ω=0, the reaction torque will disappear completely and the inductor rotor (14) will stop generating the reaction torque to restart the phenomenon. In reality, the inductor rotor (14) will never reach the driver rotor speed but will be very close.

Finally, we have transformed a normal synchronous alternator into a unique or exclusive asynchronous or induction motor with two rotors that perform part of the core of the new machine, identified as "EMIDA" (Electro-Magnetic Integrated Driver Alternator.

Now, suppose we connect mechanically by pulleys and a belt or by gears, the inductor rotor (14) and a rotor of a regular alternator. The result is that the speed of the inductor rotor (14) and then of the alternator rotor depends from the speed of the driver rotor (16) and from its magnetic induction value "B". In fact, to have an electrical power "P" generated from the alternator, with no lost power (efficiency "E"=100%), the mechanical power requested at the inductor rotor and then at driver rotor is evaluated as follows:

$$P = \omega_{IR} \times C_L$$

where:

$\omega_{IR}$=inductor rotor speed $C_L$=–C=Load torque

The exitation current in the driver rotor coils (20) tends to have the motion of the inductor rotor (14). The generation of the power "P" then depends upon the intensity of the magnetic induction "B" of the driver rotor (16) that develops the torque "$C_L$" and the value of the differential speed "ω".

$$\omega = \omega_{DR} - \omega_{IR}$$

where:

$\omega_{DR}$=driver rotor speed $\omega_{IR}$=inductor rotor speed

In fact, if the driver rotor speed increases because the speed of primary engine increases, the excitation current in the driver rotor coils (20) must be decreased to provide a higher differential speed "ω" from the inductor rotor speed.

Now, if we make a real alternator stator (12) around the inductor rotor (14) of the differential machine (10) of the above example, then we create another array of magnetic poles with relative excitation coils (24) on the external surface of the inductor rotor (14), we will obtain a primitive configuration of the present invention that we can identify as a constant frequency differential speed generator. This generator (10) accepts a variable speed input and generates an AC output at constant frequency and constant voltage, because the speed of the inductor rotor (14) can be kept constant.

Physics Consideration

The torque "$C_L$" is the load torque or the transmitted torque. The value of this torque is estimated as follows:

$$C_L = K \times B \times I_2$$

Where:

K=constant numeric value

B=driver rotor magnetic induction and $I_2$=inductor rotor induced current.

And further;
Where:
  $Z_2$=inductor rotor impedance
  $L_2$=inductor rotor inductance,
  η=Machine efficiency
  φ=driver rotor magnetic flux
  ω=Differential speed between driver rotor and inductor rotor
  $R_2$=inductor rotor resistance
  $X_{L2}$=inductor rotor reactance
  N=inductor rotor number of wire turns
  S=Cross section pole area; and
  $E_2$=inductor rotor inducted voltage Considering the machine efficiency η=100%, the inductance $L_2$=0 and the reactance $X_{L2}$=0 (because the inductance $L_2$ is very small due to the very small gap between inductor rotor and driver rotor, the very close installation of wires, etc.).

$$Z_2 = \sqrt{R_2^2 + X_{L2}^2} = \sqrt{R_2^2 + (\omega L_2^2)}$$

$$Z_2 = R_2$$

$$I_2 = \frac{E_2}{Z_2} = \frac{E_2}{R_2} = \frac{K \times \omega \times N \times \Phi}{R_2}$$

$$I_2 = \frac{K \times \omega \times N \times B \times S}{R_2} = K_2 \times \omega \times B$$

Considering the expression of the torque $C_L$ and carrying out a mathematic substitution:

$$C_L = K \times B \times I_2 = K \times B \times K_2 \times \omega \times B = K_C \times \omega \times B^2$$

$$C_L = K_C \times \omega \times B^2 = K_C \times B^2 \times (\omega_{DR} - \omega_{LR})$$

$$\omega_{LR} = \omega_{DR} - \frac{C_L}{K_C \times B^2}$$

To have the same inductor rotor speed "$\omega_{IR}$" when the driver rotor speed (due to the engine) increases, the induction "B" must be decreased.

The present invention is an application of a constant frequency differential speed generator in a brushless configuration, integrated with a unique special system identified as electronically controlled electromagnetic reaction driver as shown in FIG. 2. The integration of the electronically controlled electromagnetic reaction driver system with the original configuration constant frequency differential speed generator changes a large part of the working concept of the original machine. The major reason is in the fact that the original version is significantly affected by thermal variations. In fact, the old version of this kind of machine (like the typical constant frequency differential speed generator) works on the same basic principle of an inductor motor with the advantages of but also with all the disadvantages of, an asynchronous machine. In detail, an induction motor must work always at the maximum speed (the inductor rotating magnetic fields speed) to reduce to minimum values the lost power, so the application of the inductor motor is suggested every time the mechanical load is working at a specific speed or R.P.M. The hope of the constant frequency differential speed generator is to work at very high rating speed but with a very large rating ratio between input and output speed (input speed—from 7,000 to 14,000 R.P.M.; output constant speed=4,000 R.P.M.). The result is a very bad efficiency (<<50%) due to very high frequency of inducted current that produces a very high shifting phase between the inductor rotor rotating magnetic fields and the driver rotor rotating magnetic field. Therefore, to keep the inductor rotor speed constant at a constant load but with higher driver rotor speed, the inducted inductor rotor current will be very high to compensate for the lost active power due to the phase shifting of the driver rotor and inductor rotor rotating magnetic fields. So for the same reason a true constant frequency differential speed generator is not an operable machine.

The solution to the thermal problems of the constant frequency differential speed generator come from the invention of the electronically controlled electromagnetic reaction driver and from its integration in the constant frequency differential speed generator configuration. The result is the configuration of the present invention that we have already seen described above. The electronically controlled electromagnetic reaction driver converts the negative factors of the constant frequency differential speed generator into advantages for the EMIDA configuration. The inductor rotor inducted current will not be any higher, in fact, the inductor rotor wire windings are not in short circuit as in the constant frequency differential speed generator, but they are supplied by a rectifier bridge and an electronic switching system to the wire winding "E" as shown in FIGS. 2, 5 and 6. The result is an active load for the inductor rotor wire winding "F" (see FIG. 2) with a very small phase shifting at high frequency (see FIG. 4).

The high frequency is also an advantage to reduce the voltage ripples on the 3 phase rectifier bridge. More, the load applied as wire winding "E" really is not because this is part of the unique inductor motor configuration as shown above.

Figure 4:
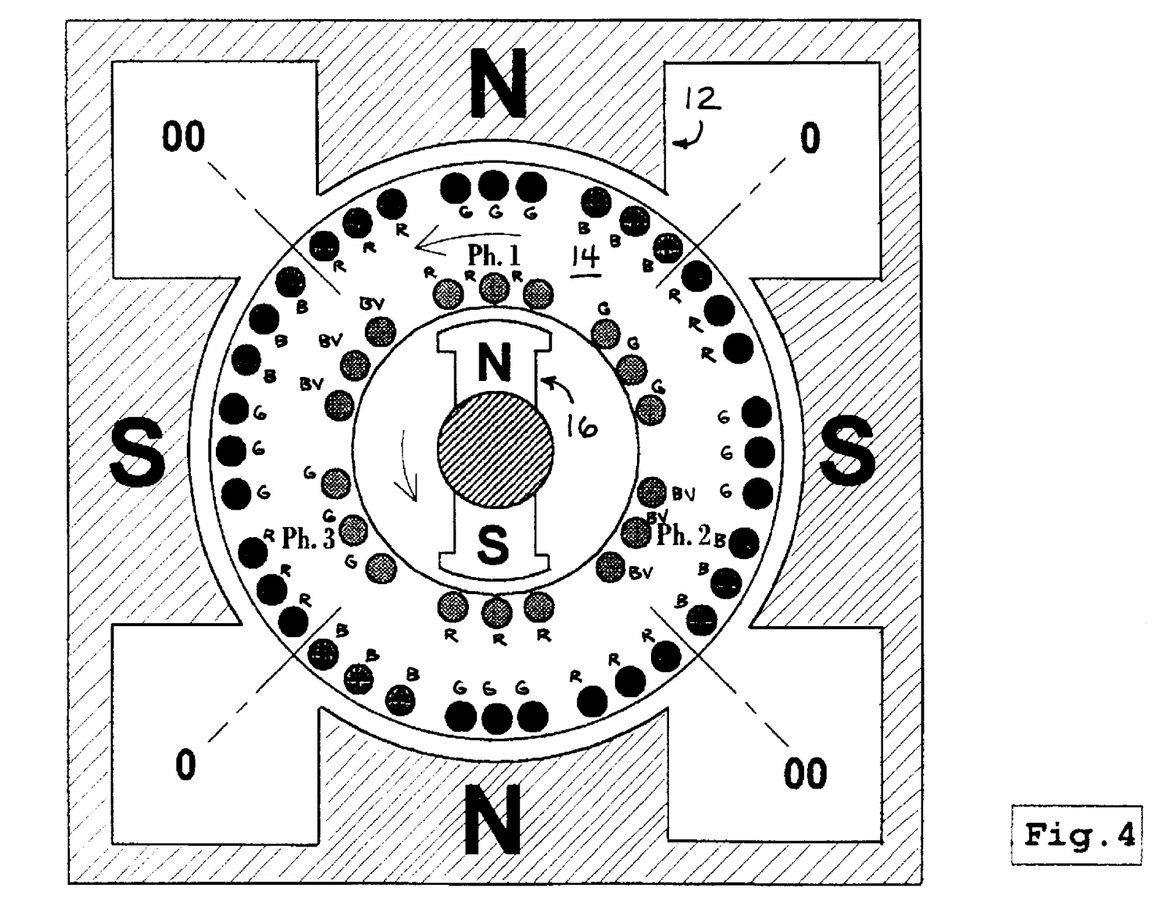
FIG. 4 is a schematic cross-sectional view of the wire windings of the present invention.
Figure 5:
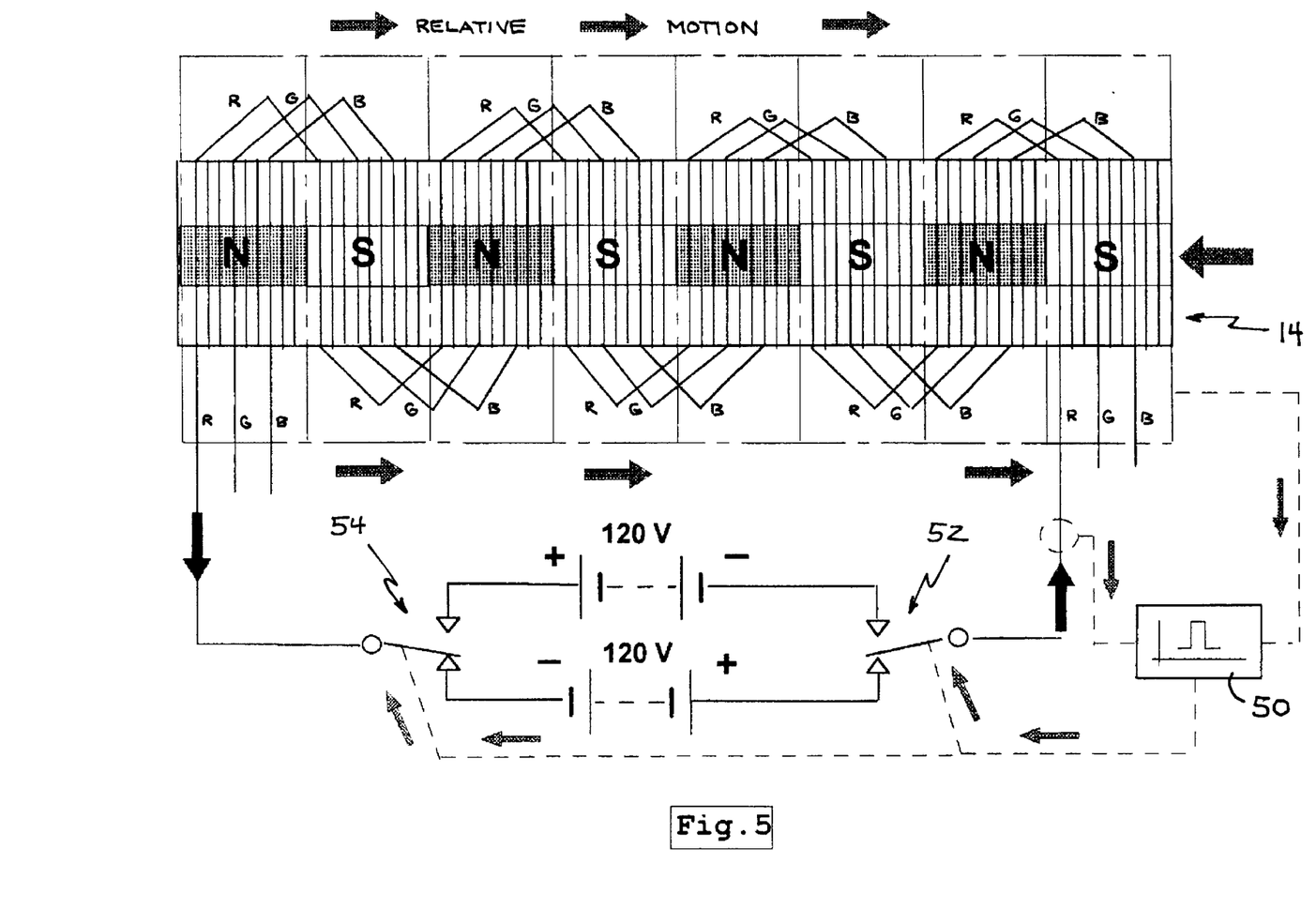
FIGS. 5 & 6 are composite electronic schematic and "E" wire winding diagrams of the inductor rotor of the present invention.
Figure 6:
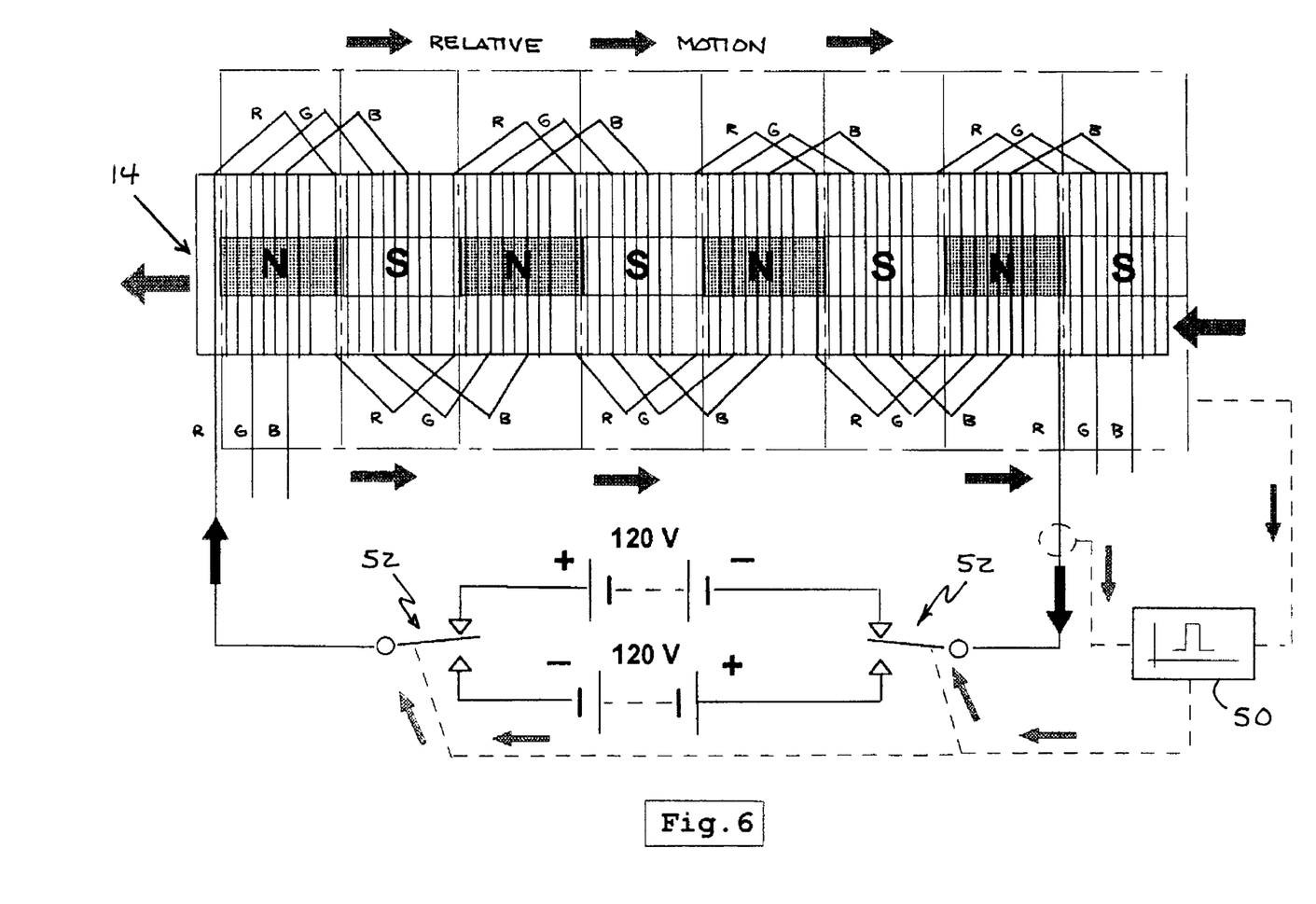

For more working details of this part of the project we need to see FIGS. 4, 5 and 6. The wire winding "E" is a DC type and a unique dynamic electronic sensor on the inductor rotor detects the exact relative position of each magnetic pole of the stator. Then an electronic switching system on the same inductor rotor will supply each wire of the wire windings "E" at the right time and at the right magnitude.

Power Flow and Working Configuration

A permanent magnetic generator (PMG) on the driver rotor (16) (see FIGS. 2 and 3) induces in the wire winding "A" of the inductor rotor (14) an electrical power controlled from the speed control unit (34) installed on the same inductor rotor (14). The speed control unit (34) supplies, by the control power unit (32), a coil "B" installed on the same inductor rotor (14), to induce in the wire winding "C" of the driver rotor (16) a higher excitation current, that rectified supplies the coil "D" on the driver rotor (16). The excitation of the coil "D" induces in the wire winding "F" of the inductor rotor (14) a current that rectified is applied to the wire winding "E" by the control power unit (32). The wire windings "F" supply a small power to the wire windings "H" also, that induces in the wire windings "L" on the stator (12) the current for the exitation of the coils "V" and "M". Then the coil "M" on the stator (12) induces in the wire windings "N" on the inductor rotor (14) a current that rectified energizes the coil "P" of the alternator magnetic inductor (14) that generates in the wire windings "S" the electrical power for the output.

The speed control unit (34) reads the speed of the inductor rotor (14), by a data link (not shown), from the generator control unit (30) and then controls the excitation current in "B" to stabilize the speed of the same inductor rotor (14). At same time, it also controls the maximum value of the motor torque and regulates the current in "E" by the regulation of the exitation current in "V". The generator control unit (30) reads the output voltage from a point of regulation and controls the exitation current in the coil "M" of the stator (12). Finally, an electrical AC power at constant frequency and constant voltage will be generated from the wire windings "S" as required.

I claim:

1. An electrical generator/motor comprising:

(a) a driver rotor;

(b) an inductor rotor;

(c) a stator;

(d) a generator control circuit connected to said stator for regulating and controlling the electrical parameters of said stator and said rotors;

(e) a speed control circuit positioned within said inductor rotor and in data communication with said generator control circuit for regulating and controlling a rotational speed of said inductor rotor; and (f) a control power circuit positioned within said inductor rotor in association with said speed control circuit for regulating and controlling a power output from said generator/motor.

* * * * *